United States Patent
Hsu et al.

(10) Patent No.: US 8,382,971 B2
(45) Date of Patent: Feb. 26, 2013

(54) METHOD OF ELECTROCHEMICAL DISSOLUTION OF RUTHENIUM-COBALT-BASED ALLOY

(75) Inventors: Mei-Hui Hsu, Tainan (TW); York Wen, Tainan (TW)

(73) Assignee: Solar Applied Materials Technology Corp., Tainan City (TW)

( * ) Notice: Subject to any disclaimer, the term of this patent is extended or adjusted under 35 U.S.C. 154(b) by 316 days.

(21) Appl. No.: 12/826,701

(22) Filed: Jun. 30, 2010

(65) Prior Publication Data
US 2011/0253552 A1 Oct. 20, 2011

(30) Foreign Application Priority Data
Apr. 15, 2010 (TW) ................. 99111824 A

(51) Int. Cl.
*C25F 5/00* (2006.01)
(52) U.S. Cl. ......... 205/704; 205/717; 205/718; 205/723
(58) Field of Classification Search .................. 205/704, 205/717, 718, 723
See application file for complete search history.

(56) References Cited

U.S. PATENT DOCUMENTS

| 4,775,452 | A  | * | 10/1988 | Kuninaga et al. ............. 205/348 |
| 6,440,194 | B1 |   | 8/2002  | Krofchak et al. |
| 2002/0152845 | A1 |   | 10/2002 | Fleming et al. |
| 2010/0065436 | A1 | * | 3/2010  | Jin ................................ 205/342 |

FOREIGN PATENT DOCUMENTS
WO  WO2008060038 A1  5/2008

OTHER PUBLICATIONS

M.H.H. Mahmound, "Leaching Platinum-Group Metals in a Sulfuric Acid/Chloride Solution" Journal of the Minerals, Metals and Materials Society 2003, April, p. 37-40.
Mahmoud M H H:"Leaching Platinum-Group Metals in a Sulfuric Acid/Chloride Solution" Apr. 2003.

* cited by examiner

*Primary Examiner* — Arun S Phasge
(74) *Attorney, Agent, or Firm* — CKC & Partners Co., Ltd.

(57) ABSTRACT

A method of electrochemical dissolution of ruthenium-cobalt (Ru—Co)-based alloy is disclosed, in which a Ru—Co-based alloy bulk is subjected into an electrolyte solution comprising about 50 wt. % to 75 wt. % of sulfuric acid, thereby electrolyzing the Ru—Co-based alloy bulk and forming a product solution comprising Ru and Co ions in the electrolyte solution.

10 Claims, No Drawings

METHOD OF ELECTROCHEMICAL DISSOLUTION OF RUTHENIUM-COBALT-BASED ALLOY

RELATED APPLICATIONS

This application claims priority to Taiwan Application Serial Number 99111824 filed Apr. 15, 2010, which is herein incorporated by reference.

FIELD OF THE INVENTION

This invention relates generally to a method of electrochemical dissolution of metal, and more particularly, to a method of electrochemical dissolution of ruthenium-cobalt (Ru—Co)-based alloy.

BACKGROUND OF THE INVENTION

Noble metals have been widely applied in a multitude of ways in various industries or technical fields, in which platinum group metals are not dissolved in acids, even though dissolving ruthenium (Ru), rhodium (Rh) and iridium (Ir) with aqua regia is very difficult.

Regarding the dissolution of noble metals, the popular method is to subject the noble metals into anodic dissolution, or called electrolysis dissolution, in which an electrolyte containing various solutes or salts is commonly employed to dissolve noble metals such as ruthenium (Ru), rhodium (Rh) and iridium (Ir). Since the noble metals are very inert, they are difficult dissolved by the combination with the electrochemical dissolution and acidic dissolution. Electrochemical dissolution may not provide high efficiency but still better than other chemical methods.

Ruthenium-cobalt (Ru—Co)-based alloy is an important film material for being a middle layer of a perpendicular magnetic recording media. Moreover, Ru—Co-based alloy is also an important catalyst material for application in hydrogen generation of a water gas shift reaction in hydrogen energy industries. Because Ru—Co-based alloy itself has special purposes as aforementioned, Ru is a noble metal and Co is important for lithium batteries, it is necessary to develop a recovering method for Ru—Co-based alloy.

One of the methods of recovering noble metals from waste metals is combined with electrochemical dissolution and acidic or alkaline treatment. Typically, making the waste metals smaller in size can elevate dissolution efficiency of noble metals due to increase of the reaction surface. For example, it is found in the experiments of decomposition tests on the special example of S-816 scrap, a Re/Ta-free Co-based alloy (40+%) with high proportions of Cr (20%) and Ni (20%) as well as, inter alia, Fe, Nb, W and Mo in the 4% range. The use of sulphuric acid as a corrosive electrolyte medium at $7 \times 10^{-5}$ Hz (polarity reversal every 4 hours) is in this case presented as being best suited to this type of scrap.

Moreover, other research is directed to an aqueous inorganic acid, preferably hydrochloric acid, which is advantageously used as the electrolyte, in the event that the superalloy powders based on the major alloy components nickel (Ni), cobalt (Co) and/or chromium (Cr) are used as the powder to be decomposed, in particular those which furthermore contain valuable material components such as Hf, Ta, Nb, Mo, W, Re and/or platinum group metals.

Furthermore, Mahmoud et al. propose a leaching process based on the ability of platinum-group metals to form stable chloro-complexes in acidic chloride solutions. Industrial catalyst losses were examined for the recovery of platinum (Pt), palladium (Pd), and rhodium (Rh) by leaching with a mixture of sulfuric acid and sodium chloride to avoid using aqua regia or autoclave conditions. Extraction of platinum and rhodium in 60% $H_2SO_4$ at 135° C. steadily increased with increasing NaCl concentrations reaching 95% and 85%, respectively, at 0.1 M NaCl after two hours. By comparison, palladium was dissolved more quickly but also reached 85% under the same conditions. (See M. H. H. Mahmound, "Leaching Platinum-Group Metals in a Sulfuric Acid/Chloride Solution" *Journal of the Minerals, Metals and Materials Society* 2003, April, 37-40.)

An additional method relates to the recovery of platinum group metals and, more particularly, to the recovery of platinum group metals from various sources (such as automobile catalysts) by roasting the source material with one or more of sulfuric acid, a sulfate and/or a bi-sulfate and with one or more halogen salt.

In consideration of a Ru—Co-based alloy with a high degree of hardness, large Ru—Co-based alloy bulk is necessarily subjected to pretreatment before recovery, in which the pretreatment is to smash or grind the large Ru—Co-based alloy bulk into smaller pieces or powder. However, the pretreatment usually makes the recovery process more complicated and expensive.

Similarly, the recovery equipments for size reduction of a Ru—Co-based alloy with a high degree of hardness are more expensive, complicated and often maintained due to quick consumption of cutting tools used in recovering Ru—Co-based alloy.

According to prior research results, they fail to anticipate or suggest the composition and concentration of the electrolyte solution and the current density with the electrochemical dissolution of Ru—Co-based alloy.

SUMMARY OF THE INVENTION

Accordingly, an aspect of the present invention provides a method of electrochemical dissolution of ruthenium-cobalt (Ru—Co)-based alloy, thereby recovering Ru—Co-based alloy.

According to the aforementioned aspect of the present invention, a method of electrochemical dissolution of Ru—Co-based alloy is disclosed, in which the method may include following steps. In an embodiment, an electrolyte solution is initially provided. The electrolyte solution may include 50 percent by weight (wt. %) to 75 wt. % of sulfuric acid. Next, Ru—Co-based alloy may be placed into the electrolyte solution, thereby electrolyzing the Ru—Co-based alloy and forming a product solution, in which the product solution comprises Ru ion and Co ion in the electrolyte solution.

In an embodiment, the electrolyte solution may further comprise an alkali metal salt or a halide salt.

In another embodiment, the alkali metal salt may be sodium chloride or potassium chloride.

In a further embodiment, the electrolyte solution may include 2.5 wt. % to 5 wt. % of sodium chloride or potassium chloride.

In a further another embodiment, the Ru—Co-based alloy may include 20 atomic percent (at. %) to 70 at. % of Co.

In a still another embodiment, the Ru—Co-based alloy may include 30 at. % to 60 at. % of Co.

With application to the aforementioned method of electrochemical dissolution of Ru—Co-based alloy, in comparison with the conventional electrochemical method for recovering noble metals, the method is beneficial to directly subject a Ru—Co-based alloy bulk (for example, a spent target) into electrochemical dissolution without any physical treatment (for example, a smashing, grinding or cutting process) or chemical treatment. Since the present method is applicable on the alloy bulk, it is also applicable on smaller slices, any surface or substrate coated with alloy thereof, micro-scale or nano-scale powder.

BRIEF DESCRIPTION OF THE DRAWINGS (none)

DETAILED DESCRIPTION OF THE PREFERRED EMBODIMENT

Accordingly, the present invention provides a method of electrochemical dissolution of Ru—Co-based alloy, in which Ru—Co-based alloy is directly subjected to an electrochemical dissolution without any physical treatment or chemical treatment, thereby electrochemically dissolving the Ru—Co-based alloy.

In an embodiment, an electrolyte solution is initially provided, in which the electrolyte solution may include 50 wt. % to 75 wt. % of sulfuric acid. Next, a Ru—Co-based alloy may be placed into the electrolyte solution, thereby electrolyzing the Ru—Co-based alloy and forming a product solution, in which the product solution comprises Ru ion and Co ion in the electrolyte solution.

If the electrolyte solution comprises more than 75 wt. % of sulfuric acid, the electrolyte additive, for example, an alkali metal salt or a halide salt, would not be dissolve in such electrolyte solution. On the other hand, if the electrolyte solution include less than 50 wt. % of sulfuric acid, metal would be deposited at the cathode, the efficiencies of electrolysis would be eliminated and subsequent recovery would become very hard.

In an example, the electrolyte additive used in electrolyte solution may be an alkali metal salt or a halide salt. In another example, the electrolyte additive may be sodium chloride or potassium chloride, for example, rather than being limited thereto.

In another example, the electrolyte solution may include 1 wt. % to 10 wt. % of sodium chloride or potassium chloride. In a further example, the electrolyte solution may include 2.5 wt. % to 5 wt. % of sodium chloride or potassium chloride.

In an embodiment, during the electrochemical dissolution process, Ru—Co-based alloy bulk (for example, a spent target) can be directly subjected to electrochemical dissolution without any physical treatment (for example, a smashing, grinding or cutting process) or chemical treatment. It is understood that the present method is also applicable on smaller slices, any surface or substrate coated with alloy thereof, micro-scale or nano-scale powder.

It is worth noting that, the Ru—Co-based alloy may include 20 atomic percent (at. %) to 70 at. % of Co in an embodiment. In another embodiment, the Ru—Co-based alloy may include 30 at. % to 60 at. % of Co.

In a still another embodiment, the Ru—Co-based alloy may further include one or more elements or noble metals. The elements or noble metals may include but be not limited in platinum (Pt), rhodium (Rh), palladium (Pd), osmium (Os), titanium (Ti) and chromium (Cr).

In addition, a direct current is applied to recover the Ru—Co-based alloy in the electrochemical dissolution according to an embodiment of the present method. In comparison with the electrochemical dissolution by using the alternating current, the apparatus of the direct current used in the electrochemical dissolution is simpler than the one of the alternating current. However, in other embodiments, the apparatus of the alternating current also achieves the electrochemical dissolution even though additional equipments are necessary required. In this embodiment, the apparatus of the alternating current facilitates to remove possible passivation layer generated on the surface of the Ru—Co-based alloy.

Basic Process

The following embodiments are implemented by placing a Ru—Co-based alloy in an electrolyte solution in an electrolytic cell. The Ru—Co-based alloy may be Ru—Co-based alloy bulk or Ru—Co-based alloy scrap. In an example, an electrolytic cell is resistant to acidic or alkaline corrosion. Electrolysis efficiency varies in the presence of different electrolytes in the electrolyte solution. The electrolyte solution can be added with alkali metal salts or halide salts, for example, sodium chloride or potassium chloride, thereby enhancing its electrolysis efficiency and increasing the electrochemical dissolution capacity.

Moreover, in the following embodiments, an anode of the electrolytic cell may be part or all made of titanium (Ti), such as Ti-based or -coated basket, mesh or clip. A cathode of the electrolytic cell may be a Ti-based or -coated plate. The Ru—Co-based alloy may be Ru—Co-based alloy scrap or a Ru—Co-based spent target that has been consumed by sputtering. The aforementioned spent target is disposed at the anode side and subjected to the electrochemical dissolution.

Furthermore, in the following embodiments, depending on the various concentrations of the sulfuric acid solution, sodium chloride or potassium chloride may be added with a weight percent of no more than 10. Pure Ru metal suffers moderate attack from saturated sodium hypochlorite and sodium chloride solutions recited in prior arts. However, the process reaction will be severe and the reaction temperature increases drastically if the sodium chlorate ($NaClO_3$) or sodium perchlorate ($NaClO_4$) solution is utilized.

Again, exception for specific settings, a direct current is applied to carry out the electrochemical dissolution at a voltage of about 6 volts in the following embodiments.

Thereinafter, various applications of the electrochemical dissolution of the present invention will be described and verified in more details referring to different compositions and concentrations of the electrolyte solution, as well as different electrolytes and different Ru—Co amounts, according to several exemplary embodiments below, while not intended to be limiting. Thus, one skilled in the art can easily ascertain the essential characteristics of the present invention and, without departing from the spirit and scope thereof, can make various changes and modifications of the invention to adapt it to various usages and conditions.

EXAMPLE 1

Electrolyte Solution Containing 75 wt. % of Sulfuric Acid and 5 wt. % of Sodium Chloride EXAMPLE 1 is related to an electrolyte solution containing 75 wt. % of sulfuric acid and 5 wt % of sodium chloride (NaCl), which is prepared in an electrolytic cell, and about 20 g (total weight) of a piece of spent target (containing about 50 at. % of Ru and 50 at. % of Co) is disposed at the anode side of the electrolytic cell. After electrolyzing for about 4 hours, a product solution is collected, and then the electrolysis efficiency and the electrolytic dissolution rate are evaluated.

EXAMPLE 2

Electrolyte Solution Containing 50 wt. % of Sulfuric Acid and 5 wt. % of Sodium Chloride EXAMPLE 2 is related to an electrolyte solution containing 50 wt. % of sulfuric acid and 5 wt. % of NaCl, which is prepared in an electrolytic cell, and about 20 g (total weight) of a piece of spent target (containing about 50 at. % of Ru and 50 at. % of Co) is disposed at the anode side of the electrolytic cell. After electrolyzing for about 4 hours, a product solution is collected, and then the electrolysis efficiency and the electrolytic dissolution rate are evaluated.

It should be noted that, the experimental operation of EXAMPLE 2 is approximately the same as the one of EXAMPLE 1 except for that the concentration of sulfuric acid in the electrolyte solution of EXAMPLE 2 is 50 wt. % but not 75 wt. % of EXAMPLE 1.

EXAMPLE 3

Electrolyte Solution Containing 50 wt. % of Sulfuric Acid and 2.5 wt. % of Sodium Chloride EXAMPLE 3 is related to an electrolyte solution containing 50 wt. % of sulfuric acid and 2.5 wt. % of NaCl, which is prepared in an electrolytic cell, and about 20 g (total weight) of a piece of spent target (containing about 50 at. % of Ru and 50 at. % of Co) is disposed at the anode side of the electrolytic cell. After electrolyzing for about 4 hours, a product solution is collected, and then the electrolysis efficiency and the electrolytic dissolution rate are evaluated.

It should be noted that, the experimental operation of EXAMPLE 3 is approximately the same as the one of EXAMPLE 2 except for that NaCl concentration in the electrolyte solution of EXAMPLE 3 is 2.5 wt. % but not 5 wt. % of EXAMPLE 2.

EXAMPLE 4

Electrolyte Solution Containing 50 wt. % of Sulfuric Acid and 2.5 wt. % of Potassium Chloride EXAMPLE 4 is related to an electrolyte solution containing 50 wt. % of sulfuric acid and 2.5 wt. % of potassium chloride (KCl), which is prepared in an electrolytic cell, and about 20 g (total weight) of a piece of spent target (containing about 50 at. % of Ru and 50 at. % of Co) is disposed at the anode side of the electrolytic cell. After electrolyzing for about 4 hours, a product solution is collected, and then the electrolysis efficiency and the electrolytic dissolution rate are evaluated.

It should be noted that, the experimental operation of EXAMPLE 4 is approximately the same as the one of EXAMPLE 3 except for that the electrolyte in the electrolyte solution of EXAMPLE 4 is KCl but not NaCl of EXAMPLE 3.

EXAMPLE 5

Electrolyte Solution Containing 50 wt. % of Sulfuric Acid and 5 wt. % of Sodium Chloride EXAMPLE 5 is related to an electrolyte solution containing 50 wt. % of sulfuric acid and 5 wt. % of NaCl, which is prepared in an electrolytic cell, and about 30 g (total weight) of sputter target scrap (containing about 25 at. % of Ru, 60 at. % of Co and 15 at. % of Cr and $TiO_2$) is disposed at the anode side of the electrolytic cell. After electrolyzing for about 4 hours, a product solution is collected, and then the electrolysis efficiency and the electrolytic dissolution rate are evaluated.

It should be noted that, the experimental operation of EXAMPLE 5 is approximately the same as the one of EXAMPLE 3 except for that NaCl concentration in the electrolyte solution of EXAMPLE 5 is 5 wt. %, and the sputter target scrap includes a weight of 30 g and a composition of about 25 at. % of Ru, 60 at. % of Co and 15 at. % of Cr and $TiO_2$.

COMPARATIVE EXAMPLE 1

Electrolyte Solution Containing 40 wt. % of Sulfuric Acid and 5 wt. % of Sodium Chloride COMPARATIVE EXAMPLE 1 is related to an electrolyte solution containing 40 wt. % of sulfuric acid and 5 wt. % of NaCl, which is prepared in an electrolytic cell, and about 20 g (total weight) of a piece of spent target (containing about 50 at. % of Ru and 50 at. % of Co) is disposed at the anode side of the electrolytic cell. After electrolyzing for about 4 hours, a product solution is collected, and then the electrolysis efficiency and the electrolytic dissolution rate are evaluated.

It should be noted that, the experimental operation of COMPARATIVE EXAMPLE 1 is approximately the same as the one of EXAMPLE 1 except for that the concentration of sulfuric acid in the electrolyte solution of COMPARATIVE EXAMPLE 1 is 40 wt. % but not 75 wt. % of EXAMPLE 1.

COMPARATIVE EXAMPLE 2

Electrolyte Solution Containing 30 wt. % of Sulfuric Acid and 5 wt. % of Sodium Chloride COMPARATIVE EXAMPLE 2 is related to an electrolyte solution containing 30 wt. % of sulfuric acid and 5 wt. % of NaCl, which is prepared in an electrolytic cell, and about 20 g (total weight) of a piece of spent target (containing about 50 at. % of Ru and 50 at. % of Co) is disposed at the anode side of the electrolytic cell. After electrolyzing for about 4 hours, a product solution is collected, and then the electrolysis efficiency and the electrolytic dissolution rate are evaluated.

It should be noted that, the experimental operation of COMPARATIVE EXAMPLE 2 is approximately the same as theone of EXAMPLE 1 except for that the concentration of sulfuric acid in the electrolyte solution of COMPARATIVE EXAMPLE 2 is 30 wt. % but not 75 wt. % of EXAMPLE 1.

COMPARATIVE EXAMPLE 3

Electrolyte Solution Containing 20 wt. % of Sulfuric Acid and 5 wt. % of Sodium Chloride COMPARATIVE EXAMPLE 3 is related to an electrolyte solution containing 20 wt. % of sulfuric acid and 5 wt. % of NaCl, which is prepared in an electrolytic cell, and about 20 g (total weight) of a piece of spent target (containing about 50 at. % of Ru and 50 at. % of Co) is disposed at the anode side of the electrolytic cell. After electrolyzing for about 4 hours, a product solution is collected, and then the electrolysis efficiency and the electrolytic dissolution rate are evaluated.

It should be noted that, the experimental operation of COMPARATIVE EXAMPLE 3 is approximately the same as the one of EXAMPLE 1 except for that the concentration of sulfuric acid in the electrolyte solution of COMPARATIVE EXAMPLE 3 is 20 wt. % but not 75 wt. % of EXAMPLE 1.

The result of the electrolysis efficiency and the electrolytic dissolution rate of EXAMPLES 1 to 5 and COMPARATIVE EXAMPLES 1 to 3 is shown in TABLE 1.

TABLE 1

The electrolysis efficiency and the electrolytic dissolution rate influenced by the concentrations of sulfuric acid and electrolyte salts.

| | Electrolyte Solution | | Duration (hour) | Voltage (volt) | Current (ampere) | Electrolytic Dissolution Rate (g/hour) | Electrolysis Efficiency (%) |
|---|---|---|---|---|---|---|---|
| EXAMPLES | | | | | | | |
| 1 | 75 wt. % $H_2SO_4$ | 5 wt. % NaCl | 4 | 6 | 9 | 2.9 | 63 |
| 2 | 50 wt. % $H_2SO_4$ | 5 wt. % NaCl | 4 | 6 | 9 | 2.75 | 60 |
| 3 | 50 wt. % $H_2SO_4$ | 2.5 wt. % NaCl | 4 | 6 | 8 | 3 | 73 |
| 4 | 50 wt. % $H_2SO_4$ | 2.5 wt. % KCl | 4 | 6 | 6 | 1.9 | 56.7 |
| 5 | 50 wt. % $H_2SO_4$ | 5 wt. % NaCl | 4 | 6 | 7.5 | 3 | 71.6 |
| COMPARATIVE EXAMPLES | | | | | | | |
| 1 | 40 wt. % $H_2SO_4$ | 5 wt. % NaCl | 4 | 6 | 6 | 2 | 39 |
| 2 | 30 wt. % $H_2SO_4$ | 5 wt. % NaCl | 4 | 6 | 4.3 | 1.4 | 30 |
| 3 | 20 wt. % $H_2SO_4$ | 5 wt. % NaCl | 4 | 6 | 4.3 | 1.3 | 26 |

According to the results of TABLE 1, with respect to EXAMPLES 1 and 2, both have similar performance in electrolysis efficiency and electrolytic dissolution rate, reasoning that the electrolysis efficiency and the electrolytic dissolution rate are less influenced by different concentrations of sulfuric acid ranging from 50 wt. % to 75 wt. % when all other experimental conditions are the same.

However, with respect to EXAMPLES 2 and 3, EXAMPLE 3 has significant increase in the electrolysis efficiency and the electrolytic dissolution rate than EXAMPLE 2, referring that less concentration (2.5 wt. %) of NaCl contributes to better electrolysis efficiency and electrolytic dissolution rate than higher concentration (5 wt. %) of NaCl when all other experimental conditions are the same.

Moreover, with respect to EXAMPLES 3 and 4, EXAMPLE 3 has significant increase in the electrolysis efficiency and the electrolytic dissolution rate than EXAMPLE 4, referring that NaCl is a better electrolyte involved in the electrochemical dissolution of the Ru—Co-based alloy than KCl when all other experimental conditions are the same.

Furthermore, in comparison with EXAMPLE 1 and COMPARATIVE EXAMPLES 1 to 3, EXAMPLE 1 has significant increase in the electrolysis efficiency and the electrolytic dissolution rate than COMPARATIVE EXAMPLES 1 to 3. This result shows that cathode metal deposition occurring in less than 50 wt. % of sulfuric acid is resulted in less electrolysis efficiency and difficult recovery when all other experimental conditions are the same. On the contrary, the electrolysis efficiency can increase to 60% or more when the concentration of sulfuric acid is more than 50 wt. %.

It should be noted that, the metal salts or halide salts, such as NaCl or KCl, are unlikely dissolve in the electrolyte solution with more than 75 wt. % of sulfuric acid, resulting in adverse influence of the electrolysis efficiency.

EXAMPLE 6

Electrolyte Solution Containing 50 wt. % of Sulfuric Acid and 2.5 wt. % of Sodium Chloride EXAMPLE 6 is related to an electrolyte solution containing 50 wt. % of sulfuric acid and 2.5 wt. % of NaCl, which is prepared in an electrolytic cell, and about 1203 g (total weight) of a spent target (containing about 40 at. % of Ru and 60 at. % of Co; Φ: 160 mm, thickness: 5 mm/sheet) is disposed at the anode side of the electrolytic cell. After electrolyzing for about 33 hours, a product solution is collected, and then the electrolysis efficiency and the electrolytic dissolution rate are evaluated.

It should be noted that, the experimental operation of EXAMPLE 6 is approximately the same as the one of EXAMPLE 2 except for that the spent target includes a weight of 1230 g but not 20 g of EXAMPLE 2, about 60 at. % of Co but not 50 at. % of EXAMPLE 2, and for about 33 hours of electrolysis time but not 4 hours.

EXAMPLE 7

Electrolyte Solution Containing 50 wt. % of Sulfuric Acid and 2.5 wt. % of Sodium Chloride EXAMPLE 7 is related to an electrolyte solution containing 50 wt. % of sulfuric acid and 2.5 wt. % of NaCl, which is prepared in an electrolytic cell, and about 3213 g (total weight) of two spent targets (containing about 52 at. % of Ru and 48 at. % of Co; Φ: 160 mm, thickness: 5 mm/sheet) is disposed at the anode side of the electrolytic cell. After electrolyzing for about 65 hours, a product solution is collected, and then the electrolysis efficiency and the electrolytic dissolution rate are evaluated.

It should be noted that, the experimental operation of EXAMPLE 7 is approximately the same as the one of EXAMPLE 2 except for that the spent targets include a total weight of 3213 g but not 20 g of EXAMPLE 2, about 48 at. % of Co but not 50 at. % of EXAMPLE 2, and for about 65 hours of electrolysis time but not 4 hours.

EXAMPLE 8

Electrolyte Solution Containing 50 wt. % of Sulfuric Acid and 2.5 wt. % of Sodium Chloride EXAMPLE 8 is related to an electrolyte solution containing 50 wt. % of sulfuric acid and 2.5 wt. % of NaCl, which is prepared in an electrolytic cell, and about 1687 g (total weight) of a spent target (containing about 70 at. % of Ru and 30 at. % of Co; Φ: 160 mm, thickness: 5 mm/sheet) is disposed at the anode side of the electrolytic cell. After electrolyzing for about 24 hours, a product solution is collected, and then the electrolysis efficiency and the electrolytic dissolution rate are evaluated.

It should be noted that, the experimental operation of EXAMPLE 8 is approximately the same as the one of EXAMPLE 2 except for that the alloy spent targets include a total weight of 1687 g but not 20 g of EXAMPLE 2, about 30 at. % of Co but not 50 at. % of EXAMPLE 2, and for about 24 hours of electrolysis time but not 4 hours.

The result of the electrolysis efficiency and the electrolytic dissolution rate of EXAMPLES 6 to 8 is shown in TABLE 2.

TABLE 2

The electrolysis efficiency and the electrolytic dissolution rate of alloy bulks.

| EXAMPLES | Original Weight (gram) | Co Content (at. %) | Electrolyte Solution | | Duration (hour) | Voltage (volt) | Current (ampere) | Electrolytic Dissolution Rate (g/hour) | Electrolysis Efficiency (%) |
|---|---|---|---|---|---|---|---|---|---|
| 6 | 1203 | 60 | 50 wt. % $H_2SO_4$ | 2.5 wt. % NaCl | 33 | 6 | 92 | 32.9 | 63 |
| 7 | 3213 | 48 | 50 wt. % $H_2SO_4$ | 2.5 wt. % NaCl | 65 | 6 | 140 | 48.1 | 65 |
| 8 | 1687 | 30 | 50 wt. % $H_2SO_4$ | 2.5 wt. % NaCl | 24 | 6 | 111 | 48.1 | 86 |

According to the results of TABLE 2, with respect to EXAMPLES 6 to 8, all provide an electrolysis efficiency greater than 60% and an electrolytic dissolution rate greater than 30 g/hour. In particular, the electrolytic dissolution rate of EXAMPLES 7 to 8 is approximate to 50 g/hour. Hence, the electrochemical dissolution of the present invention can be achieved to 60% or more even though it is recovered from the alloy bulk such as large Ru—Co-based spent target.

COMPARATIVE EXAMPLE 4

Electrolyte Solution Containing Water and 3M Sodium Hydroxide

COMPARATIVE EXAMPLE 4 is related to an electrolyte solution containing water and 3M sodium hydroxide (NaOH), which is prepared in an electrolytic cell, and about 20 g (total weight) of a piece of spent target (containing about 50 at. % of Ru and 50 at. % of Co) is disposed at the anode side of the electrolytic cell. After electrolyzing for about 4 hours, a product solution is collected, and then the electrolysis efficiency and the electrolytic dissolution rate are evaluated.

It should be noted that, the experimental operation of COMPARATIVE EXAMPLE 4 is approximately the same as the one of EXAMPLE 2 except for that the electrolyte solution of COMPARATIVE EXAMPLE 4 includes water but not sulfuric acid, and the electrolyte of COMPARATIVE EXAMPLE 4 is NaOH but not NaCl.

COMPARATIVE EXAMPLE 5

Electrolyte Solution Containing 3M Sodium Hydroxide and 0.5 wt. % to 1.5 wt. % of Anhydrous Sodium Sulphate in Water COMPARATIVE EXAMPLE 5 is related to an electrolyte solution containing 3M sodium hydroxide (NaOH) and 0.5 wt. % to 1.5 wt. % of anhydrous sodium sulphate ($Na_2SO_4$) in water, which is prepared in an electrolytic cell, and about 20 g (total weight) of a piece of spent target (containing about 50 at. % of Ru and 50 at. % of Co) is disposed at the anode side of the electrolytic cell. After electrolyzing for about 4 hours, a product solution is collected, and then the electrolysis efficiency and the electrolytic dissolution rate are evaluated.

It should be noted that, the experimental operation of COMPARATIVE EXAMPLE 5 is approximately the same as the one of COMPARATIVE EXAMPLE 4 except for that the electrolyte solution of COMPARATIVE EXAMPLE 5 includes 3M NaOH and 0.5 wt. % to 1.5 wt. % of anhydrous $Na_2SO_4$ but not 3M NaOH solution.

COMPARATIVE EXAMPLE 6

Electrolyte Solution Containing 32 wt. % of Hydrogen Chloride

COMPARATIVE EXAMPLE 6 is related to an electrolyte solution containing 32 wt. % of hydrogen chloride (HCl), which is prepared in an electrolytic cell, and about 20 g (total weight) of a piece of spent target (containing about 50 at. % of Ru and 50 at. % of Co) is disposed at the anode side of the electrolytic cell. After electrolyzing for about 4 hours, a product solution is collected, and then the electrolysis efficiency and the electrolytic dissolution rate are evaluated.

It should be noted that, the experimental operation of COMPARATIVE EXAMPLE 6 is approximately the same as the one of COMPARATIVE EXAMPLE 4 except for that the electrolyte solution of COMPARATIVE EXAMPLE 5 includes 32 wt. % of HCl but not 3M NaOH solution.

COMPARATIVE EXAMPLE 7

Electrolyte Solution Containing 98 wt. % of Sulfuric Acid

COMPARATIVE EXAMPLE 7 is related to an electrolyte solution containing 98 wt. % of sulfuric acid ($H_2SO_4$), which is prepared in an electrolytic cell, and about 20 g (total weight) of a piece of spent target (containing about 50 at. % of Ru and 50 at. % of Co) is disposed at the anode side of the electrolytic cell. After electrolyzing for about 4 hours, a product solution is collected, and then the electrolysis efficiency and the electrolytic dissolution rate are evaluated.

It should be noted that, the experimental operation of COMPARATIVE EXAMPLE 7 is approximately the same as the one of COMPARATIVE EXAMPLE 4 except for that the electrolyte solution of COMPARATIVE EXAMPLE 7 includes 98 wt. % of $H_2SO_4$ in the absence of other salts but not 3M NaOH solution.

COMPARATIVE EXAMPLE 8

Electrolyte Solution Containing Water and 5 wt. % of Sodium Chloride

COMPARATIVE EXAMPLE 8 is related to an electrolyte solution containing 5 wt. % of NaCl in water, which is prepared in an electrolytic cell, and about 20 g (total weight) of a piece of spent target (containing about 50 at. % of Ru and 50 at. % of Co) is disposed at the anode side of the electrolytic cell. After electrolyzing for about 4 hours, a product solution is collected, and then the electrolysis efficiency and the electrolytic dissolution rate are evaluated.

It should be noted that, the experimental operation of COMPARATIVE EXAMPLE 8 is approximately the same as the one of COMPARATIVE EXAMPLE 4 except for that the electrolyte solution of COMPARATIVE EXAMPLE 8 includes 5 wt. % of NaCl but not 3M NaOH solution.

COMPARATIVE EXAMPLE 9

Electrolyte Solution Containing 98 wt. % of Sulfuric Acid and 1 wt. % to 5 wt. % of Sodium Persulphate COMPARATIVE EXAMPLE 9 is related to an electrolyte solution containing 98 wt. % of sulfuric acid and 1 wt. % to 5 wt. % of sodium persulphate ($Na_2S_2O_8$), which is prepared in an electrolytic cell, and about 20 g (total weight) of a piece of spent target (containing about 50 at. % of Ru and 50 at. % of Co) is disposed at the anode side of the electrolytic cell. After electrolyzing for about 4 hours, a product solution is collected, and then the electrolysis efficiency and the electrolytic dissolution rate are evaluated.

It should be noted that, the experimental operation of COMPARATIVE EXAMPLE 9 is approximately the same as the one of COMPARATIVE EXAMPLE 7 except for that the electrolyte solution of COMPARATIVE EXAMPLE 9 includes 1 wt % to 5 wt. % of $Na_2S_2O_8$.

COMPARATIVE EXAMPLE 10

Electrolyte Solution Containing 98 wt. % of Sulfuric Acid and 1 wt. % to 3 wt. % of Sodium Perchlorate COMPARATIVE EXAMPLE 10 is related to an electrolyte solution containing 98 wt. % of sulfuric acid and 1 wt. % to 3 wt. % of sodium perchlorate ($NaClO_4$), which is prepared in an electrolytic cell, and about 20 g (total weight) of a piece of spent target (containing about 50 at. % of Ru and 50 at. % of Co) is disposed at the anode side of the electrolytic cell. After electrolyzing for about 4 hours, a product solution is collected, and then the electrolysis efficiency and the electrolytic dissolution rate are evaluated.

It should be noted that, the experimental operation of COMPARATIVE EXAMPLE 10 is approximately the same as the one of COMPARATIVE EXAMPLE 9 except for that the electrolyte solution of COMPARATIVE EXAMPLE 10 includes 1 wt. % to 3 wt. % of $NaClO_4$ but not 1 wt. % to 5 wt. % of $Na_2S_2O_8$.

COMPARATIVE EXAMPLE 11

Electrolyte Solution Containing 98 wt. % of Sulfuric Acid and 1 wt. % to 4 wt. % of Sodium Chlorate COMPARATIVE EXAMPLE 11 is related to an electrolyte solution containing 98 wt. % of sulfuric acid and 1 wt. % to 4 wt. % of sodium chlorate ($NaClO_3$), which is prepared in an electrolytic cell, and about 20 g (total weight) of a piece of spent target (containing about 50 at. % of Ru and 50 at. % of Co) is disposed at the anode side of the electrolytic cell. After electrolyzing for about 4 hours, a product solution is collected, and then the electrolysis efficiency and the electrolytic dissolution rate are evaluated.

It should be noted that, the experimental operation of COMPARATIVE EXAMPLE 11 is approximately the same as the one of COMPARATIVE EXAMPLE 10 except for that the electrolyte solution of COMPARATIVE EXAMPLE 10 includes 1 wt. % to 4 wt. % of $NaClO_3$ but not 1 wt. % to 3 wt. % of $NaClO_4$.

TABLE 3

The electrolysis efficiency and the electrolytic dissolution rate influenced by various compositions of the electrolyte solutions.

| COMPARATIVE EXAMPLES | Electrolyte Solution | | Duration (hour) | Voltage (volt) | Current (ampere) | Electrolytic Dissolution Rate (g/hour) | Electrolysis Efficiency (%) |
|---|---|---|---|---|---|---|---|
| 4 | $H_2O$ | 3M NaOH | 4 | 6 | — | 0 | 0 |
| 5 | $H_2O$ | 3M NaOH 0.5% to 1.5% $Na_2SO_4$ | 4 | 6 | — | 0 | 0 |
| 6 | $H_2O$ | 32% HCl | 4 | 6 | — | 0 | 0 |
| 7 | 98% $H_2SO_4$ | — | 4 | 6 | — | 0.5 | 27 |
| 8 | $H_2O$ | 5% NaCl | 4 | 6 | 4 | 0.15 | 7 |
| 9 | 98% $H_2SO_4$ | 1% to 5% $Na_2S_2O_8$ | 4 | 6 | 2 to 0.8 | 0.4 to 0.2 | 36 to 61 |
| 10 | 98% $H_2SO_4$ | 1% to 3% $NaClO_4$ | 4 | 6 | 2.4 to 0.8 | 1.1 to 0.3 | 94 to 73 |
| 11 | 98% $H_2SO_4$ | 1% to 4% $NaClO_3$ | 4 | 6 | 0.7 to 1.8 | 0.65 to 0.125 | 40 to 35 |

According to the results of TABLE 3, with respect to COMPARATIVE EXAMPLES 4 and 5, both provide worse electrolysis efficiencies, such as 0% of the electrolysis efficiency and 0 g/hour of the electrolytic dissolution rate, resulting from alkaline electrolyte solution and the electrolyte additive of NaOH or $Na_2SO_4$.

Moreover, with respect to the result of COMPARATIVE EXAMPLE 6 in TABLE 3, the electrolysis efficiency is 0% even though an acidic electrolyte solution such as HCl solution is used.

Furthermore, with respect to the results of COMPARATIVE EXAMPLES 7 and 8, in which the two electrolyte solutions include sulfuric acid and NaCl solution respectively, the Ru—Co-based alloy can be subjected to the electrochemical dissolution in COMPARATIVE EXAMPLES 7 and 8, but their electrolysis efficiencies are low as 27% and 7%, respectively. Besides, with respect to the results of COMPARATIVE EXAMPLES 9 to 11, $NaClO_4$ and $Na_2S_2O_8$ that serve as the electrolyte additives in COMPARATIVE EXAMPLES 9 to 11 are explosive so that the cost of related safety equipments and the labor safety risk will be increased.

According to the embodiments of the present invention, the aforementioned method of electrochemical dissolution of Ru—Co-based alloy is beneficial to directly subject a Ru—Co-based alloy bulk (for example, a spent target) into an electrochemical dissolution without any physical treatment (for example, a smashing, grinding or cutting process) or chemical treatment. Since the present method is applicable on the alloy bulk, it is also applicable on smaller slices, any surface or substrate coated with alloy thereof, micro-scale or nano-scale powder As is understood by a person skilled in the art, the foregoing embodiments of the present invention are illustrated of the present invention rather than limiting of the present invention. It is intended to cover various modifications and similar arrangements included within the spirit and scope of the appended claims. Therefore, the scope of which should be accorded the broadest interpretation so as to encompass all such modifications and similar structure.

What is claimed is:

1. A method of electrochemical dissolution of ruthenium-cobalt (Ru—Co)-based alloy, comprising:
   providing an electrolyte solution, wherein the electrolyte solution includes 50 percent by weight (wt. %) to 75 wt. % of sulfuric acid; and
   subjecting a Ru—Co-based alloy into the electrolyte solution, thereby electrolyzing the Ru—Co-based alloy and forming a product solution, wherein the product solution comprises Ru ion and Co ion in the electrolyte solution.

2. The method of electrochemical dissolution of Ru—Co-based alloy according to claim 1, wherein the electrolyte solution further comprises an alkali metal salt or a halide salt.

3. The method of electrochemical dissolution of Ru—Co-based alloy according to claim 2, wherein the alkali metal salt is sodium chloride or potassium chloride.

4. The method of electrochemical dissolution of Ru—Co-based alloy according to claim 3, wherein the electrolyte solution comprises 1 wt. % to 10 wt. % of sodium chloride or potassium chloride.

5. The method of electrochemical dissolution of Ru—Co-based alloy according to claim 3, wherein the electrolyte solution comprises 2.5 wt. % to 5 wt. % of sodium chloride or potassium chloride.

6. The method of electrochemical dissolution of Ru—Co-based alloy according to claim 1, wherein the Ru—Co-based alloy is not subjected to a physical or chemical pretreatment.

7. The method of electrochemical dissolution of Ru—Co-based alloy according to claim 6, wherein the physical pretreatment is smashing, grinding or cutting process.

8. The method of electrochemical dissolution of Ru—Co-based alloy according to claim 1, wherein the Ru—Co-based alloy comprises 20 atomic percent (at. %) to 70 at. % of Co.

9. The method of electrochemical dissolution of Ru—Co-based alloy according to claim 1, wherein the Ru—Co-based alloy comprises 30 at. % to 60 at. % of Co.

10. The method of electrochemical dissolution of Ru—Co-based alloy according to claim 1, the Ru—Co-based alloy further comprises one or more metals selected from the group consisting of platinum (Pt), rhodium (Rh), palladium (Pd), osmium (Os), titanium (Ti) and chromium (Cr).

* * * * *